United States Patent [19]

Bradley

[11] 4,260,468
[45] Apr. 7, 1981

[54] GAS INDUCTION SWIMMING POOL CHLORINATOR

[76] Inventor: James A. Bradley, 717 N. Halifax Dr., Ormond Beach, Fla. 32074

[21] Appl. No.: 73,807

[22] Filed: Sep. 10, 1979

[51] Int. Cl.³ .............................................. C25C 7/00
[52] U.S. Cl. .................................. 204/260; 210/192; 204/266; 204/272
[58] Field of Search .................... 210/192, 169, 62, 60; 204/266, 272, 275, 278, 151, 152, 128, 260

[56] References Cited

U.S. PATENT DOCUMENTS

| | | | |
|---|---|---|---|
| 1,373,394 | 4/1921 | Allen | 204/266 |
| 2,078,517 | 4/1937 | Vorce | 204/266 |
| 3,223,242 | 12/1965 | Murray | 204/266 |
| 4,097,356 | 6/1978 | Yates | 204/266 |
| 4,177,116 | 12/1979 | De Nora et al. | 204/272 |

*Primary Examiner*—Benoît Castel
*Attorney, Agent, or Firm*—Duckworth, Hobby, Allen & Pettis

[57] ABSTRACT

An apparatus for chlorinating water of a swimming pool. The device includes a main unit that is inserted into a cannister containing water; the main unit including a perforated barrel with a membrane therearound. The barrel containing salt and a gas collection dome fitted on top of the barrel, having a perforated downward shroud containing anode elements connected by wiring to an exterior electric power source; the anode elements extending into the salt and water, and a gas discharge outlet line extending from the dome.

2 Claims, 9 Drawing Figures

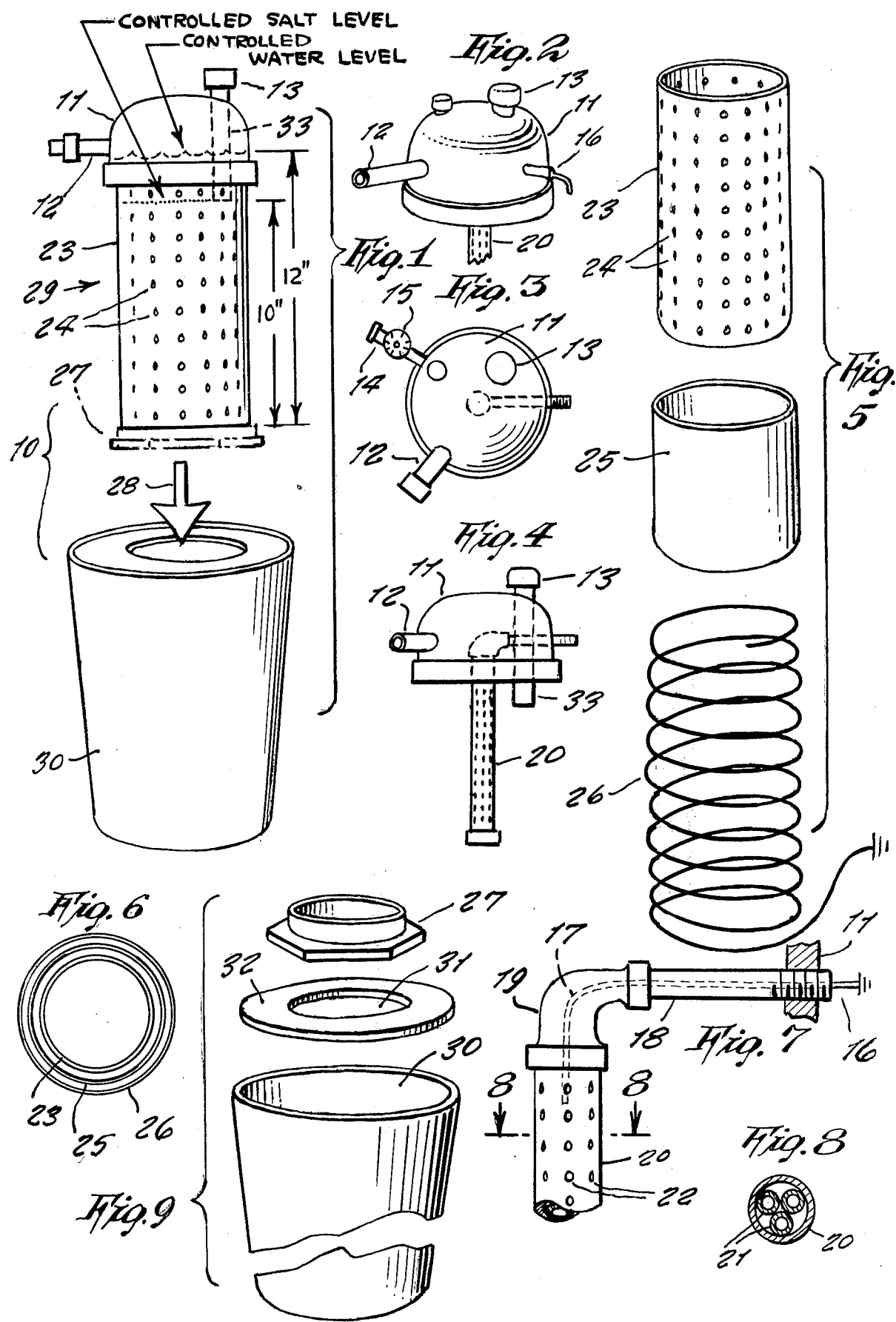

GAS INDUCTION SWIMMING POOL CHLORINATOR

SUMMARY OF THE INVENTION

This invention relates generally to swimming pool maintenance equipment. More specifically it relates to a chlorinator.

It is well known that most swimming pools are maintained algae-free by complex filter systems connected to the pool's plumbing.

Therefore, it is a principal object of the present invention to provide a chlorinator that is simple and inexpensive, and is entirely independent of any connection to a filter plumbing system.

BRIEF DESCRIPTION OF THE DRAWING

FIG. 1 is an assembled view of the invention.

FIG. 2 is a perspective view of a dome or slip cap thereof.

FIG. 3 is a top view thereof.

FIG. 4 is a side view thereof.

FIG. 5 is an exploded perspective view of the perforated cylinder, sleeve and spring.

FIG. 6 is a top view thereof shown assembled.

FIG. 7 is an enlarged detail of a pipe shown in FIG. 4.

FIG. 8 is a cross sectional view on line 8—8 of FIG. 7.

FIG. 9 is an exploded perspective view of other components.

PREFERRED EMBODIMENT

Referring now to the invention in greater detail. The reference numeral 10 represents a gas induction swimming pool chlorinator according to the present invention; wherein there is a center module or slip cap 11 which acts as a gas forming chamber. A gas discharging line 12 extends therefrom for discharging gas to the pool.

The slip cap includes a salt loading or charging port 13. A water fed line 14 to the slip cap is provided with a control valve 15. An electrical conduit 16 extends into the slip cap, and includes a positive copper insulated wire 17, and fits through a P. V. C. pipe 18 threaded into the dome wall, and through a P. V. C. elbow 19 into a P. V. C. shroud 20 containing three carbon welding rods 21, which acts as an anode element. The shroud includes perforations 22 therethrough.

The dome or slip cap is fitted upon a top of a center module barrel 23, provided with perforations 24. The barrel is fitted inside a cylindrical membrane 25 made of compressed asbestos sheet packing material. A coil of galvanized wire 26 is fitted around the membrane; the coil acting as a cathode to serve as the negative side of the device. A flat slip unit 27 made of a P. V. C. material serves as a stable base by fitting on the bottom of the center module barrel, and thus enclosing the lower end thereof.

As indicated by arrow 28, the above described main unit 29 is inserted into a cannister 30. Prior to securement of the flat slip unit on the lower end of the center module barrel. The barrel is first inserted through a central hole 31 of a lid 32. The flat slip unit is then secured to the barrel of the main unit, and when thus assembled is then lowered into the cannister, and the lid friction snap-fitted within a top end of the cannister.

The cannister is of four gallon capacity and is made of an impervious composition material. Water is placed therein, and serves as a cathode medium of an electrolytic process.

As indicated in FIG. 1, salt placed into the main unit is controlled to a ten inch depth by being added through the charging port 13, to a depth that aligns with a lower end of the charging port filler 33. The water is controlled to a depth of twelve inches by extending up to the outlet line 12.

In operative use the wire 17 is connected to a 110–120 voltage, 60 kilo watts electric power source of 0–8 amperes, and which is provided with a rheostat switch. All wiring and connections are grounded and insulated, so that there is no danger of electrical shock.

Thus electroylsis of the water is completed, so as to provide a chlorinating gas that is carried outward from line 12 to the pool.

It is therefore understood that changes in the basic construction may be made, as long as they are limited to the scope of the appended claims.

I claim:

1. A gas induction swimming pool chlorinator comprising:

a substantially cylindrical canister with a hole at the top thereof, said canister made of substantially water impervious material and adapted to hold water which serves as a cathode medium;

a main unit adapted to be inserted into the hole of said cylindrical canister, said main unit comprising a center module barrel provided with a plurality of perforations, a cylindrical membrane surrounding said center module barrel, a coil of wire acting as a cathode disposed around said membrane;

a slip cap adapted to being disposed on top of the main unit, said slip cap comprising a substantially hemispherical member, a gas discharge line connected to and in communication with the interior of said hemispherical member, a salt charging port in communication with the hemispherical member, a water line attached to and in communication with said hemispherical member, and an electrical conduit in communication with the interior of said hemispherical member;

a source of electrical energy;

means for connecting said coil of galvanized wire to said source of electrical energy;

an electrical wire connected to said source of electrical energy and disposed in the interior of said electrical conduit;

a plurality of carbon welding rods connected to said electrical wire; and a shroud made of electrical insulating material having a plurality of perforations, said shroud surrounding said carbon welding rods and acting as an anode.

2. The apparatus of claim 1 wherein said membrane is made of compressed asbestos sheet packing material.

* * * * *